Feb. 16, 1926.

A. MEIANI 1,573,085

APPARATUS FOR RECOVERING NAPHTHA FLOATING ON THE SURFACE OF WATER

Filed August 23, 1924    2 Sheets-Sheet 1

Inventor
Alessandro Meiani.
per ⟨signature⟩
Attorney

Feb. 16, 1926.　　　　　　　　　　　　　　　　1,573,085
A. MEIANI
APPARATUS FOR RECOVERING NAPHTHA FLOATING ON THE SURFACE OF WATER
Filed August 23, 1924　　2 Sheets-Sheet 2

Inventor
Alessandro Meiani.
per
Attorney.

Patented Feb. 16, 1926.

1,573,085

UNITED STATES PATENT OFFICE.

ALESSANDRO MEIANI, OF SPEZIA, ITALY.

APPARATUS FOR RECOVERING NAPHTHA FLOATING ON THE SURFACE OF WATER.

Application filed August 23, 1924. Serial No. 733,855.

*To all whom it may concern:*

Be it known that I, ALESSANDRO MEIANI, a subject of the King of Italy, residing at Spezia, in the Kingdom of Italy, have invented certain new and useful Improvements in Apparatus for Recovering Naphtha Floating on the Surface of Water, of which the following is a specification.

The present invention relates to a boat designed to be particularly employed for the recovery of naphtha or like liquids floating on the surface of water, said boat being provided with rotary cylinders dipping into the water, so as to cause the naphtha to adhere to thin surface, in combination with means capable of detaching said adherent naphtha and of driving the latter into a collecting tank stationed on board the boat.

In the annexed drawing schematically illustrating an embodiment of the invention, Fig. 1 is a side elevation of the boat;

Figure 1:
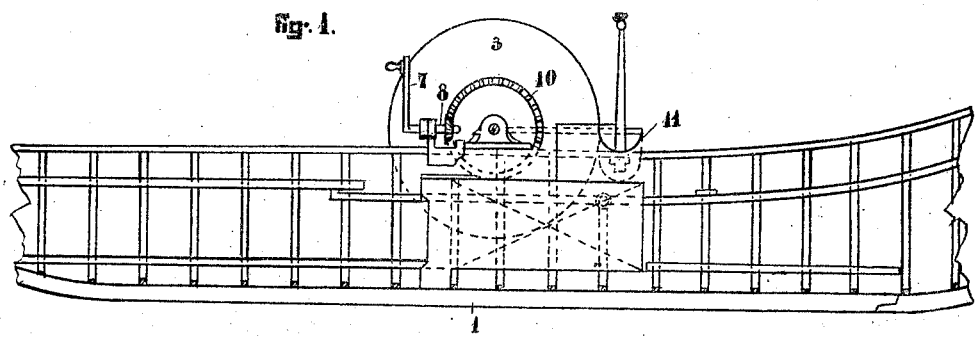
Figure 2:
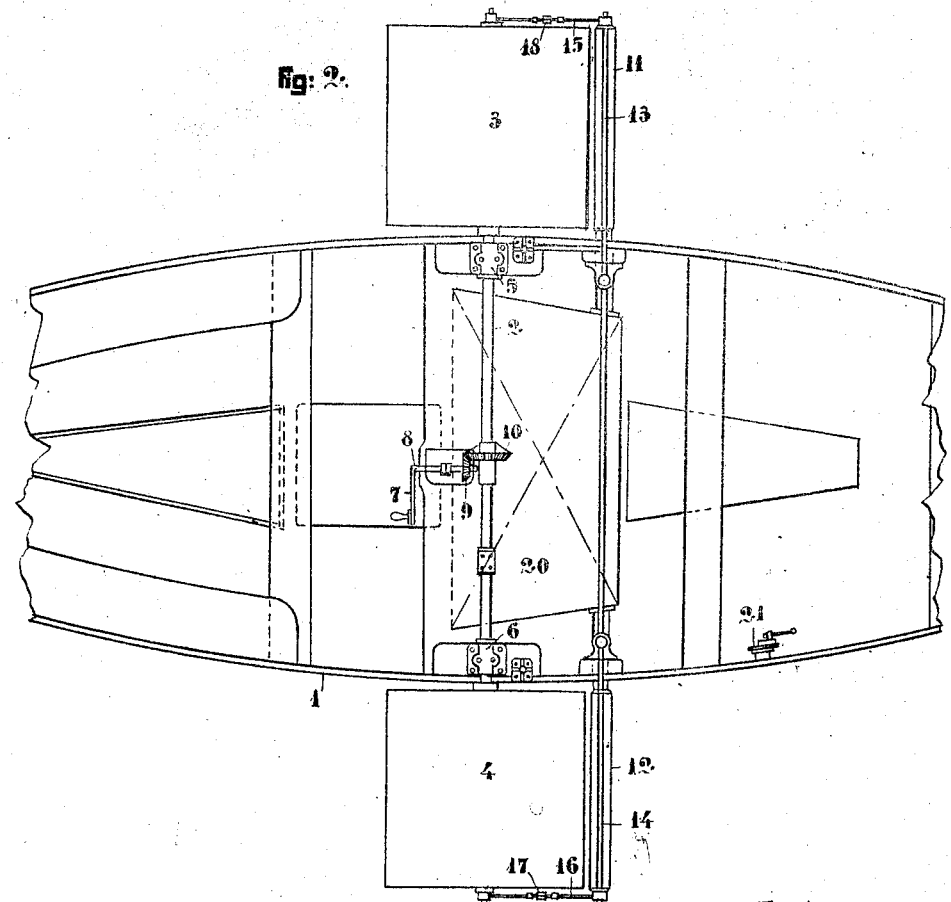
Fig. 2 is a plane view of Fig. 1.
Figure 3:
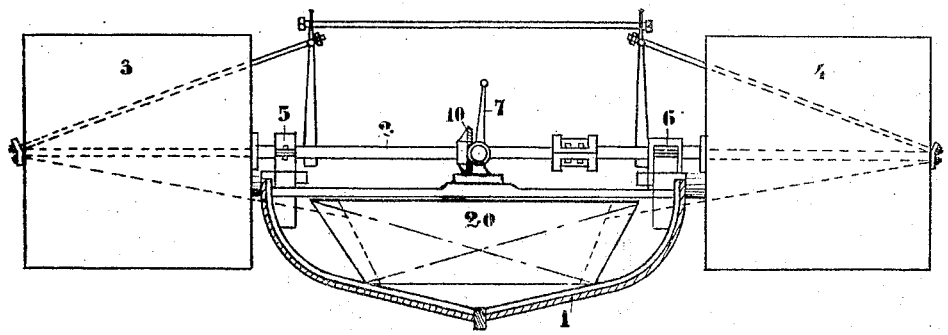
Fig. 3 is a front view of Fig. 1.
Figure 4:
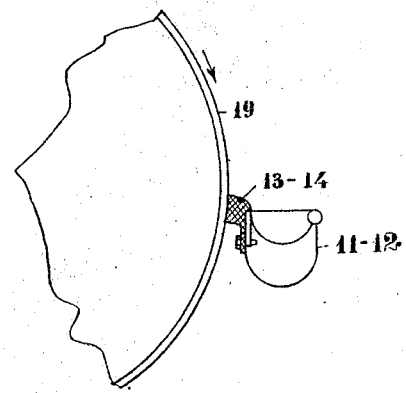

Fig. 4 refers to a detail.

In the drawing —1— denotes a boat of any suitable shape and size, upon which is arranged the shaft —2—, to which are fastened the two cylinders —3— and —4—; the shaft —2— rotates upon the supports —5— and —6— and is arranged in such a way that, when the boat is unloaded, the two cylinders —3— and —4— are dipping into the water by about ⅙ of their diameter.

The crank —7—, the axis —8—, the pinion —9— and the wheel —10— are designed to transmit the rotary motion to the shaft —2— and to the corresponding cylinders —3— and —4—; said motion may be imparted either by hand, as shown on the drawing, or by connecting the axis —8— with a motor of any kind.

Laterally at the cylinders are provided two channels —11—12— of conical shape and arranged in such a way that their bottoms are inclined towards the centre of the boat.

Upon the edge of each channel is fastened a rubber strip —13—14—, and the channels are arranged in such a position that the aforesaid strips are parallel to the axes of the corresponding cylinders.

To maintain the rubber strips into a smooth contact with the surfaces of the corresponding cylinders, there are provided the draw bars —15—16— which are adjustable by means of screw sliding blocks —17—18—.

During the rotation of the cylinders, the rubber strips wipe the naphtha off the surface —19— of the cylinders and cause it to drip into the channels —11—12—, which lead it into the collecting tank —20— arranged on board the boat.

Claim.

A boat for recovering naphtha floating on the surface of water, provided with rotary cylinders partially dipping into the water, so as to carry the naphtha adhering to their surface, in combination with a brush slightly contacting with the lateral surface of the cylinders so as to remove the naphtha conveyed upward and conduits arranged to receive the naphtha wiped out by the brushes and to deliver it into a collecting tank.

In testimony whereof I affix my signature this seventh day of August 1924.

ALESSANDRO MEIANI.